United States Patent [19]

Lerner

[11] Patent Number: 4,613,320
[45] Date of Patent: Sep. 23, 1986

[54] CONTAINER FORMING APPARATUS

[75] Inventor: Bernard Lerner, Peninsula, Ohio

[73] Assignee: Automated Packaging Systems, Inc., Twinsburg, Ohio

[21] Appl. No.: 763,065

[22] Filed: Aug. 5, 1985

Related U.S. Application Data

[63] Continuation of Ser. No. 543,526, Oct. 20, 1983, abandoned.

[51] Int. Cl.$^4$ .................. B31B 1/64; B31B 49/04
[52] U.S. Cl. ..................... 493/198; 493/203
[58] Field of Search ............... 493/189, 193, 194, 198, 493/199, 203, 206

[56] References Cited

U.S. PATENT DOCUMENTS

| | | | |
|---|---|---|---|
| 3,194,124 | 7/1965 | Warp | 493/198 X |
| 3,384,528 | 5/1968 | Lehmacher et al. | 493/203 X |
| 3,508,378 | 4/1970 | Fehr et al. | 53/180 |
| 3,552,278 | 1/1971 | Guenther | 493/198 X |
| 3,735,673 | 5/1973 | Sheehan et al. | 493/203 X |
| 3,847,708 | 11/1974 | Takahashi et al. | 493/203 X |
| 3,912,575 | 10/1975 | Zelnick | 493/203 X |
| 3,940,305 | 2/1976 | Stenberg | 493/203 X |
| 4,250,796 | 2/1981 | Achelpohl et al. | 493/203 |
| 4,449,962 | 5/1984 | Copia | 493/203 X |

FOREIGN PATENT DOCUMENTS 557840  5/1958  Canada .............................. 493/203

Primary Examiner—E. Michael Combs
Attorney, Agent, or Firm—Watts, Hoffmann, Fisher & Heinke Co.

[57] ABSTRACT

Apparatus for forming a chain of interconnected containers from a continuous web of flexible material such as plastic. The apparatus includes upper and lower assembly portions 10a, 10b, the upper portion reciprocally mounting a heat sealing head 12 having a pair of depending jaws 44 that define heat sealing edges 50. The head is driven downwardly until the edges 50 contact associated contact bars 90, 92, clamping the web material therebetween and forming a pair of spaced, parallel transverse heat seals 98, defining leading and trailing edges of adjacent containers 99a, 99b. A perforating device 100 reciprocally mounted in the assembly portion 10b includes a perforating wheel 102 reciprocally movable between the contact bars 90, 92 is cycled to cut a transverse perforation in the web material between the adjacent heat seals 98. The web remains stationary during both the heat sealing and perforating cycle so that the heat seals and perforation are precisely registered. The upper portion 10a of the assembly is pivotally attached to the lower portion 10b which is stationary, to facilitate access to the web feed path.

3 Claims, 5 Drawing Figures

CONTAINER FORMING APPARATUS

This application is a continuation, of application Ser. No. 543,526, filed 10/20/83 abandoned.

DESCRIPTION

1. Technical Field

The present invention relates generally to apparatus and methods for forming containers and in particular to a method and apparatus for forming a chain of severable containers from flexible strip material.

2. Background Art

Apparatus for forming containers such as envelopes or bags from flexible sheet material, such as polypropylene or other plastic, are known or have been proposed in the past. In one known method, strips of interconnected containers are produced by positioning plastic web portions (or individual webs) in an overlying relation and then joining the web portions at spaced locations to delimit the longitudinal extent of each container. Typically, the junctures are formed by heat sealing devices. Edge seals can also be formed in order to join longitudinal edges of the container when formed from individual webs.

In order to facilitate severance of the individual bags from the chain, a line of weakness is formed at each juncture. Generally, the line of weakness comprises a perforation formed at the heat seal location. The apparatus for producing this line of weakness is typically located at a location spaced from the heat sealing station. The perforating device usually comprises a perforating bar that strikes the web to form a transverse perforation across the web at predetermined positions spaced longitudinally along the web.

In order to provide properly formed containers, the perforations must be precisely located at the heat seal location so that the container will remain intact when it is severed from the remainder of the web. Web registration is especially critical when using preprinted web material. Should the web become misregistered during the container forming process, the mispositioned perforations would render the chain of containers useless.

Present methods and apparatus for maintaining web register when forming containers from a preprinted web have not been totally satisfactory or have been prohibitively expensive.

DISCLOSURE OF INVENTION

The present invention provides a new and improved method and apparatus for forming a chain of interconnected containers from flexible sheet material, such as polypropylene plastic. In the preferred embodiment, the containers are formed from a web of material. The web is folded longitudinally to define overlying walls of the containers. Trailing and leading edges of adjacent containers are defined by parallel, spaced transverse heat seals. A perforation is formed between the heat seals to facilitate separation of each container from the rest of the web. The fold in the web material defines one longitudinal edge of each container, leaving the opposite edge of each container open to enable filling of the container.

According to the invention, the disclosed apparatus forms the parallel heat seals (that define the leading and trailing edges of adjacent containers) and the perforation in a single processing step. As a result, the heat seals and perforation are accurately registered at all times since the web does not move between the heat sealing and perforating step. The invention enables the user, such as a bulk mailing service, to use a preprinted, raw web material to form a chain of interconnected containers just prior to a filling or envelope stuffing step.

According to the invention, the sealing and perforating apparatus includes a frame structure, that supports a reciprocally movable jaw subassembly mounted for movement towards and away from fixed contact bars, and a perforating device mounted for transverse movement across the web path. Preferably the contact bars are fixedly mounted below and in alignment with the jaws.

The jaw subassembly defines a pair of spaced jaws which are each heated by a heating device such as an electrical resistance element. The strip material which as indicated above, may be in the form of two overlying webs or a single web, folded over to define two overlying web portions, is positioned beneath the sealing jaws. The subassembly is then driven towards the seal contact bars until the jaws abut the bars. The jaws, upon contacting the web material, form a pair of spaced, transverse heat seals.

In a preferred construction, the perforating device comprises a perforating wheel carried by a carriage slidably mounted for transverse movement with respect to the web material. The perforating wheel is positioned beween the fixed contact bars. The cutting edge of the perforating wheel rides against a fixed backup bar positioned slightly above and between the contact bars. To form a perforation in the web material, the carriage is driven from one end of the frame to the other. As the carriage moves across the frame, the web material between the wheel and the backup bar is perforated.

The extremes of movement of the carriage are greater than the transverse extent of the web material so that when the perforating wheel is in its rest position (between perforating cycles) it is out of contact with the web material to allow the web to feed through the head assembly between the heat sealing/perforating cycles. The perforating wheel, however, remains in contact with the backup bar.

According to a feature of the invention, the perforating carriage is slidably supported by a pair of parallel guide rods mounted below the heat seal contact bars. The extremes of movement for the carriage are defined by abutments located at the extreme ends of the guide rods. In the preferred arrangement, the carriage is driven between the abutments by a pneumatically operated cable cylinder. Preferably, the carriage is driven from one extreme to the other during a perforation cycle and remains at that position until the strip material is indexed and another perforation is to be formed. Thus, the carriage returns to its initial position as it forms a perforation between a subsequent pair of heat seals.

In a preferred and disclosed arrangement, the perforating wheel is rotatably supported by a lever that is pivotally attached, on one end, to the reciprocating carriage. The other end of the lever is spring biased and as a result, the perforating wheel is spring biased towards its associated backup bar.

According to another feature of the invention, the heat sealing/perforating assembly includes a movable upper portion and a fixed lower portion, the upper portion being pivotally attached to the lower portion. This construction facilitates access to the heat sealing jaws, the contact bars and the perforating device. In the disclosed arrangement, the upper portion mounts the heat sealing jaw subassembly so that when the upper portion of the assembly is pivoted upwardly, the underside of the jaws and the upper surface of the contact bars are exposed. This feature enables the user to clear material misfeeds easily and also facilitates maintenance of the components.

According to still another feature of the invention, the jaw subassembly is supported for reciprocating motion by a pair of spaced guide rods located on opposite sides of the frame. The jaw subassembly is driven towards the contact bars to form the heat seals in the web, by an actuator which in the illustrated embodiment is pneumatically operated. The carriage returns to its return position by a return spring.

Additional features of the invention will become apparent and a fuller understanding obtained by reading the following detailed description made in connection with the accompanying drawings.

BEST MODE FOR CARRYING OUT THE INVENTION

Figure 1:
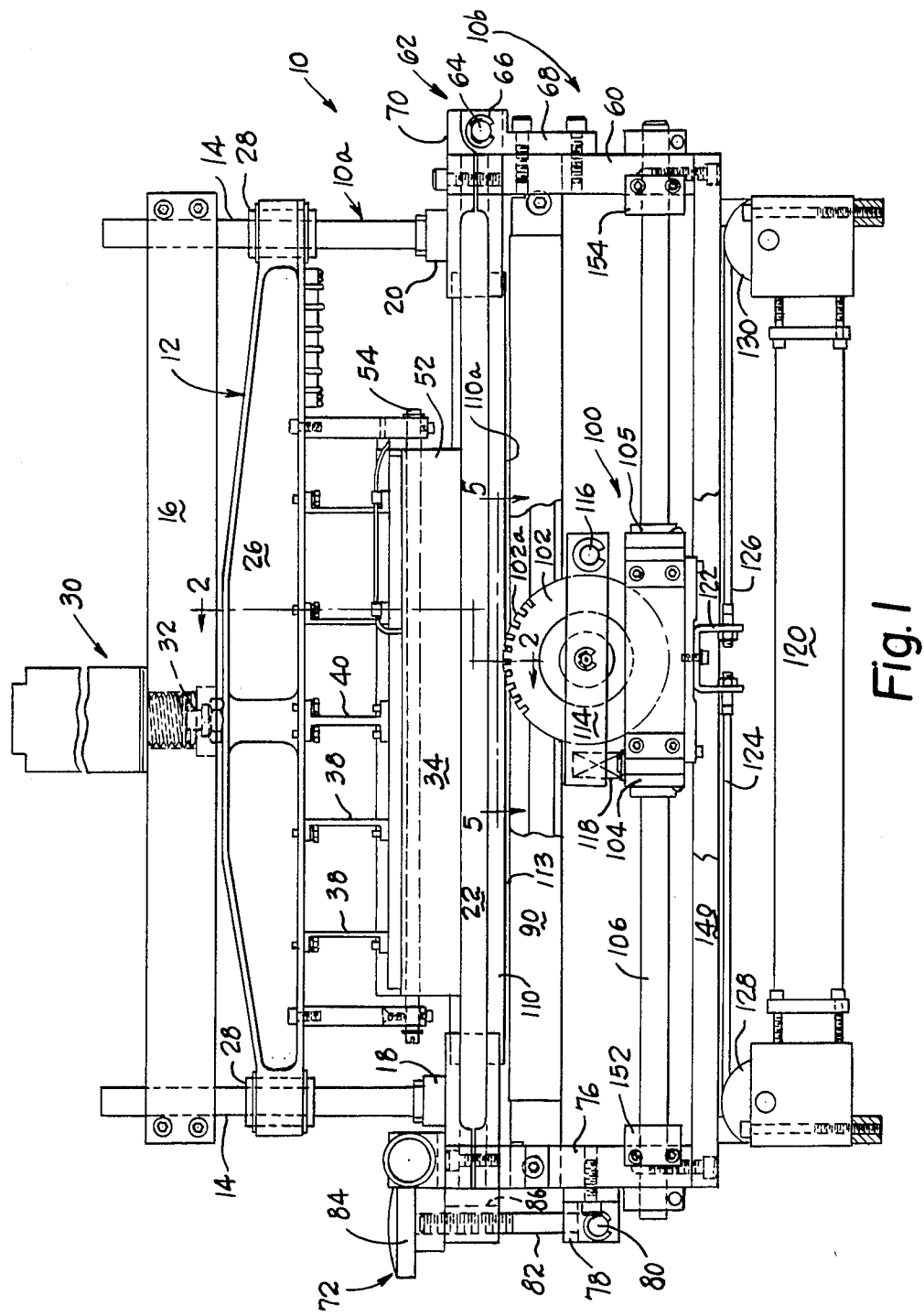
FIG. 1 is a side elevational view of a heat sealing and perforating assembly constructed in accordance with the preferred embodiment of the invention.

FIG. 1 illustrates the overall construction of an apparatus for forming a chain of interconnected containers from a web or strip material, embodying the present invention. The apparatus is operative to form a pair of parallel, transverse heat seals, defining the leading and trailing edges of adjacent containers and further operative to perforate the region between the heat seals to facilitate separation of each container from the rest of the web. The apparatus comprises an assembly that includes a frame structure indicated generally by the reference character 10 having a movable upper portion 10a pivotally attached to a fixed lower portion 10b.

The upper portion 10a slidably supports a reciprocally movable sealing head 12 on a pair of parallel guide rods 14. The upper ends of the guide rods 14 are fixed in a spaced relation by an upper support bar 16. The lower ends of the guide rods 14 are held by spaced end members 18, 20, forming part of the upper portion 10a of the assembly 10. A pair of lower support rods 22 (only one is shown in FIG. 1) span the end frame members 18, 20 and are located on either side of a heat sealing/perforation station.

The sealing head 12 includes a transverse support beam 26 that mounts bushings 28 at opposite ends, which slidably receive the guide rods 14. In the preferred embodiment, an actuator, indicated by the reference character 30 is mounted to the upper support bar 16 and includes an actuator rod 32 attached to the center of the beam 26. In the preferred arrangement, the actuator 30 is pneumatically operated and when pressurized drives the beam 26 downwardly (as viewed in FIG. 1). A return spring (not shown) preferably forming part of the actuator 30, returns the beam 26 to its upper, rest position when the actuator 30 is depressurized.

Figure 2:
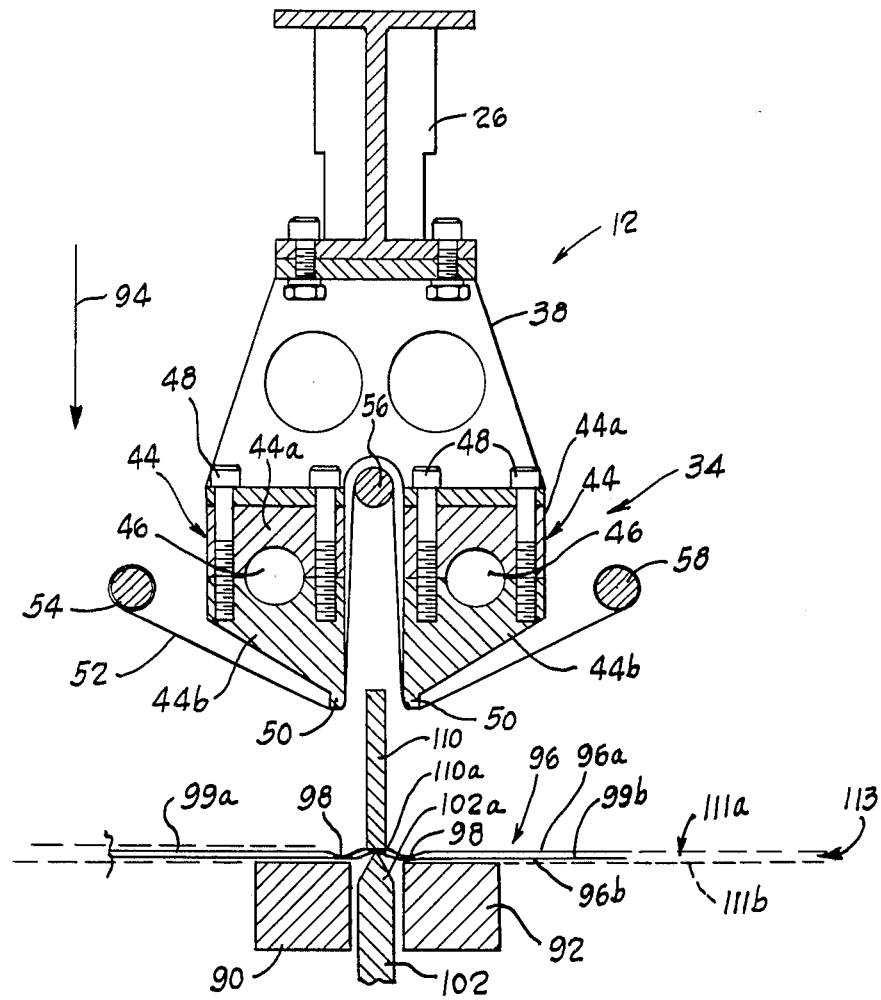
FIG. 2 is a fragmentary sectional view of the appratus as seen from the plane indicated by the line 2—2 in FIG. 1, with parts removed for clarity.

An elongate, heat sealing unit 34 is suspended from the support beam 26 by a plurality of U-shaped brackets 38 and a centrally positioned I-shaped bracket 40. Referring also to FIG. 2, the sealing unit 34 includes a pair of spaced sealing jaws 44. As seen best in FIG. 2, each heat sealing jaw 44 includes upper and lower portions 44a, 44b, respectively which clamp associated heating elements 46. Fasteners 48 maintain the assembled relation of the parts 44a, 44b. The lower jaw portions 44b define elongate sealing edges 50 which extend transversely with respect to the direction of the material feed. As will be explained, when the lower seal edges 50 contact the container material, a pair of spaced, parallel, transverse heat seals is formed in the web material. To prevent adherence of the container material to the heat seal edges 50, a release material, such as a teflon fabric 52 covers the edges 50. In the illustrated arrangement, the release material 52 extends from a supply spindle 54, around a guide spindle 56 and is wound onto a takeup spindle 58. With this construction, as the material 52 wears in the vicinity of the sealing edges 50, the takeup spindle 58 is rotated to pull fresh material into an overlying position over the sealing edges 50.

Figure 3:
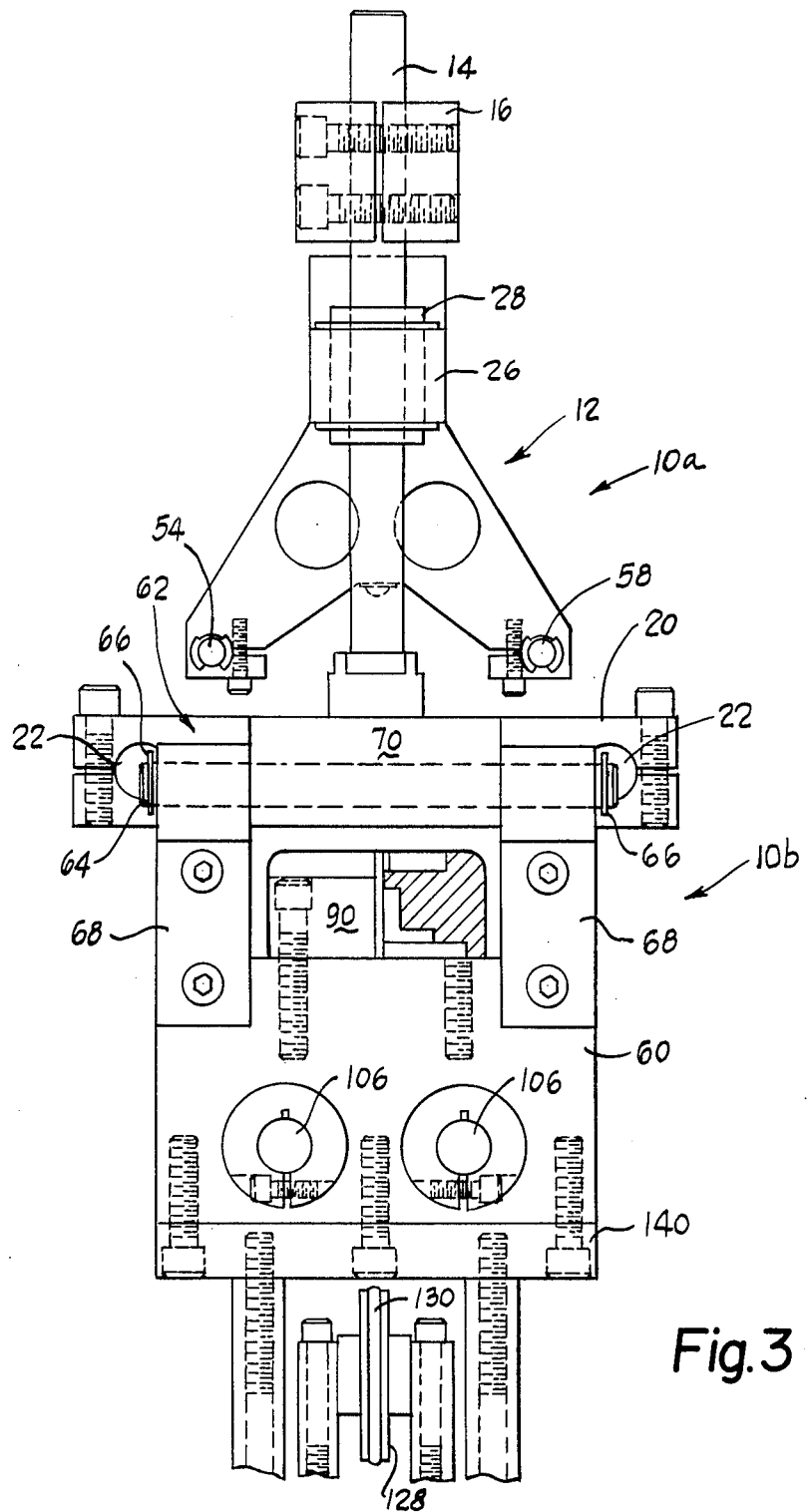
FIG. 3 is a right end view of the apparatus shown in FIG. 1.

Referring again to FIG. 1, the upper portion 10a is pivotally attached to the lower portion 10b. In particular, the right end member 20 is pivotally connected to a side plate 60 forming part of the lower assembly portion 10b, by a hinge arrangement 62. Referring also to FIG. 3, a pivot pin 64 is held in position by C-rings 66 and extends through spaced vertical arms 68 extending upwardly from the lower assembly portion 10b on either side of a laterally extending hinge plate 70 forming part of the right end member 20 of the upper assembly portion 10a.

Figure 4:
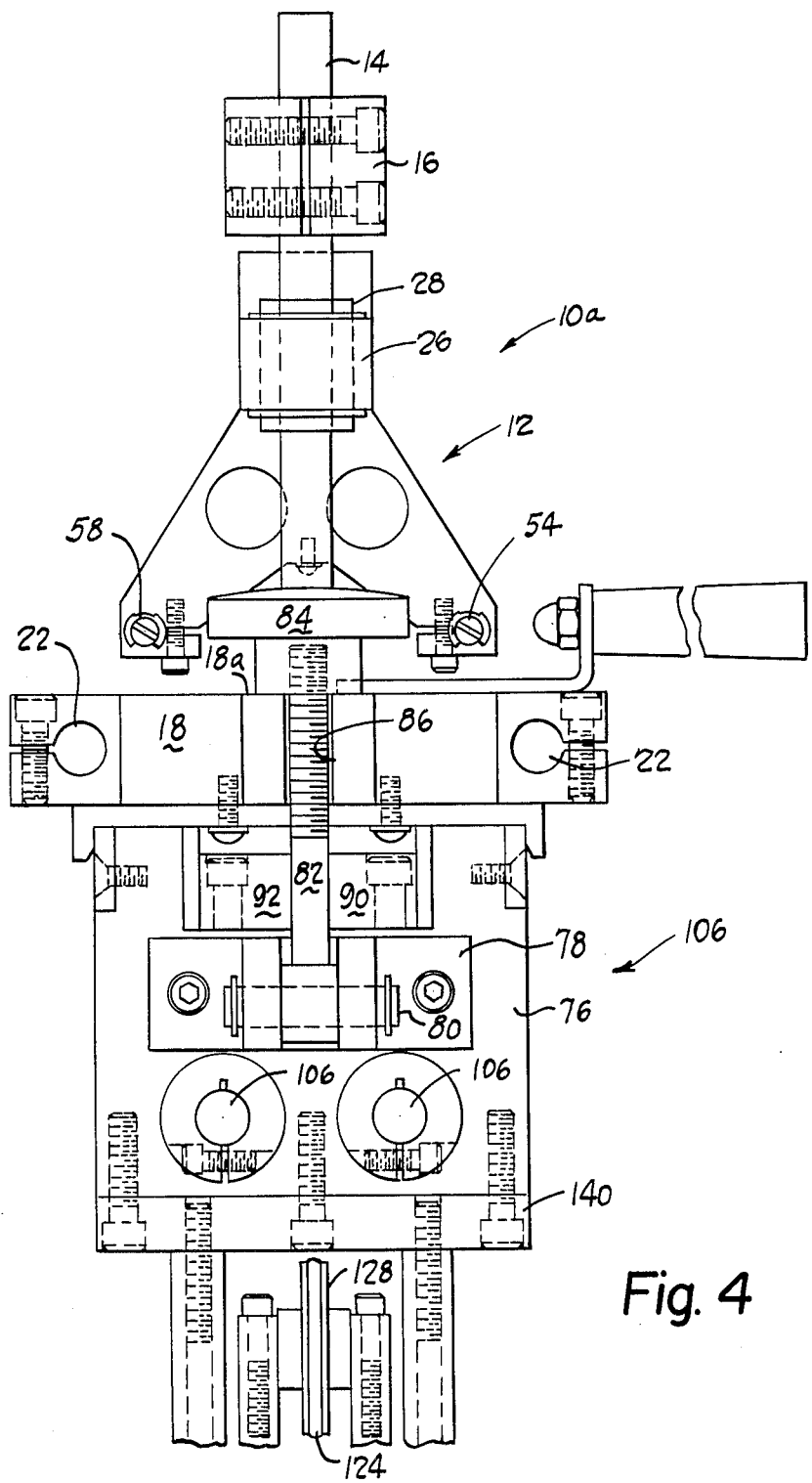
FIG. 4 is a left end view of the apparatus shown in FIG. 1.

The left end (as viewed in FIG. 1) of the upper assembly portion is held in its operative position by a clamping arrangement indicated generally by the reference character 72. Referring also to FIG. 4, the lower assembly portion 10b includes a left side plate 76 to which a bracket 78 is secured. The bracket 78 rotatably mounts a hinged pin arrangement which includes a laterally extending pin 80 that rotatably carries an elongate pin 82. The upper end of the pin 82 is threaded and receives a clamping knob 84. The left end member 18 of the upper assembly portion 10a includes a slot 86, adapted to receive the pin 82 and as seen in FIGS. 1 and 4, the clamping knob 84 contacts an upper surface 18a of the right end member 18 and is tightened in order to clamp the upper portion 10a of the assembly in position.

The stationary lower assembly portion 10b mounts seal contact bars 90, 92 (see FIG. 2) mounted in alignment with the heat sealing jaws 44. In operation, the sealing head 12 is driven downwardly (as indicated by arrow 94) by the actuator 30 (shown in FIG. 1) until the sealing edges 50 engage the associated contact bars 90, 92.

As seen in FIG. 2, a web 96 of container material, having overlying plies 96a, 96b, is positioned below the jaws 44. When the sealing unit 12 is driven downwardly, the plies 96a, 96b are clamped between the sealing head 12 and the contact bars and the heat transmitted from the jaws forms two spaced, parallel heat seals 98 in the material, thus joining the web plies 96a, 96b to form leading and trailing edges of adjacent containers 99a, 99b. The sealing head 12 then rises to release the material from between the jaws and the contact bars.

In accordance with the invention, a perforation is formed between the heat seals 98 either during or after the heat sealing operation. In actuality, the perforations can be formed prior to the heat sealing cycle if desired. In the preferred construction a perforation device indicated generally by the reference character 100 is slidably mounted in the lower assembly portion 10b. The device 100 preferably includes a perforation cutting wheel 102 rotatably supported in a carriage 104 that is slidably mounted for reciprocating motion by a pair of guide rods 106. The carriage includes bushings 105 which engage the guides 106. A cutting edge 102a of the perforating wheel 102 extends between the seal contact bars 90, 92 and rides against a backup bar 110 that is rigidly secured between the end frame members 18, 20 forming part of the upper assembly portion 10a. Preferably a lower edge 110a of the backup bar 110 (against which the perforating wheel 102 rides) is located in a plane slightly higher than a lateral plane (indicated by the reference characters 111a, 111b, respectively in FIG. 2) defined by the seal contact bars 90, 92. In short, the plane defined by the lower surface 110a is slightly higher than the plane of travel of the container material through the assembly thus defining a gap (indicated by the reference character 113 in FIG. 2). With this construction, the material is not hindered by the lower edge of the backup bar 110 as it is indexed through the heat sealing/perforation device.

Figure 5:
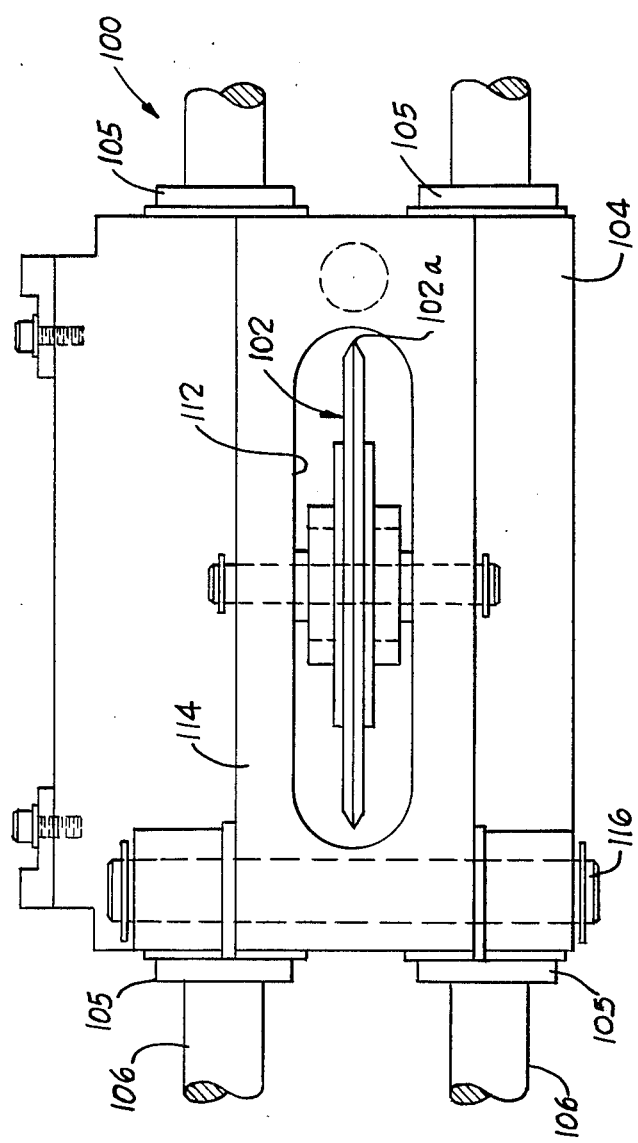
FIG. 5 is a fragmentary view as seen from the line 5—5 in FIG. 1.

Referring also to FIG. 5, the perforating wheel 102 is rotatably mounted within a recess 112 formed in a lever 114 pivotally mounted to the right end of the carriage 104 by a pin 116. The left end of the lever is spring biased upwardly by a spring 118. With this construction, the perforating wheel 102 is constantly biased towards the backup bar 110.

In order to produce the transverse perforation of the container material, the carriage 104 is driven from one end of the guide rods 106 to the other. The transverse travel of the carriage 104 causes the perforating wheel 102 to cut perforations into the web material located between the backup bar 110 and the perforating wheel 102 as seen best in FIG. 2. Because the web 96 remains stationary during the heat sealing/perforating cycle, the perforation will always be precisely located between the heat seals 98. In the preferred method, the carriage is driven in only one direction in each perforating cycle. Thus, when the carriage 104 reaches one extreme of travel, the web material is again indexed and a heat seal cycle initiated. The return stroke of the carriage 104 thus perforates a subsequent heat seal location.

In the preferred embodiment, the carriage 104 is driven by a pneumatically operated cable cylinder 120. In particular, a U-shaped bracket 122 is attached to the bottom of the carriage 104. Cables 124, 126 operatively driven by the cable cylinder are attached to the bracket 122. The cables 124, 126 are reeved around respective pulleys 128, 130 forming a part of the cable cylinder assembly. The cylinder 120 is double acting and when actuated in one direction pulls the cable 128 to cause leftward movement in the carriage 104 and when actuated in the other direction, pulls the cable 126 to produce rightward movement in the carriage 104. As seen in FIG. 1, the cable cylinder assembly 120 is mounted to a base plate 140 suitably fastened to the side plates 60, 76, forming part of the lower assembly portion 10b. A suitable pneumatic control system (not shown) properly times the actuation of the heat sealing head 12 (by the actuator 30) and the movement in the perforating device 102 (by the cable cylinder 120).

In summary, the web 96 of material from which the containers 99a, 99b are to be formed is fed through the assembly of the present invention. In particular, the material 96 is fed through the gap 113 (see FIG. 2) defined between the backup bar 110 and the seal contact bars 90, 92. It should be noted that, in other than perforating cycles, the carriage 104 is positioned at one of the extreme ends of the guide rods 106 against either the abutment 152 or the abutment 154. The web material is then readily passed through the gap 113 without hindrance.

When the material is properly registered, the heat sealing/perforating cycle is initiated. The actuator 30 is energized to drive the sealing head 12 downwardly so that the web plies 96a, 96b are clamped between the heat sealing unit 34 and the contact bars 90, 92 thus forming a pair of the spaced heat seals 98 and joining the overlying layers of material. The heat seals 98 form the trailing edge of one container 99a and the leading edge of an adjacent container 99b. The region between the adjacent heat seals is then perforated by actuating the cable cylinder 120 to drive the carriage 104 across the guide rods 106 thus forming a line of weakness between the heat seals 98 to facilitate separation of the adjacent containers 99a, 99b. At the conclusion of the heat sealing and perforation cycle, the sealing head 12 returns to its uppermost position (illustrated in FIG. 1) and the perforating device 102 is positioned at one extreme of movement thus allowing the material to be pulled or pushed through the gap 113 until another heat sealing-/perforation location on the web is registered with the assembly. The cycle is then again initiated.

Although the invention has been described with a certain degree of particularity it should be understood that various changes can be made to it by those skilled in the art without departing from the spirit or scope as hereinafter claimed.

I claim:

1. An apparatus for forming a chain of interconnected containers from a longitudinal, flexible web of material having two overlying plies, comprising:
    (a) sealing means for forming two adjacent spaced apart heat seals on said web at spaced intervals, said seals extending transversely with respect to the longitudinal extent of said web and defining trailing and leading edges of adjacent containers;
    (b) said heat sealing means including structure for making concurrent heat seal contact across the entire transverse extent of said web;
    (c) seal drive means for driving said sealing means into heat sealing contact with said web;
    (d) a perforating mechanism for forming a perforation between said adjacent heat seals while said web is located at said sealing means, said mechanism comprising:
        (i) a rotatable perforating wheel having an axis of rotation oriented substantially transverse to the transverse extent of said web;
        (ii) a carriage rotatably mounting said perforating wheel;
        (iii) guide means located immediately adjacent said structure for making concurrent heat seal contact, said guide means supporting said carriage for movement substantially parallel to the transverse extent of said web and having limits of motion such that said perforating wheel can be moved to a position out of contact with said web and said heat sealing means;
(iv) drive means for driving said carriage between said limits of motion;
(v) spring biasing means urging said perforating wheel into frictional contact with a backup bar fixedly secured with respect to said sealing means, said frictional contact between said perforating wheel and said backup bar causing said wheel to rotate as said carriage moves between said limits of motion such that said perforating wheel produces a line of perforations of said web intermediate said adjacent heat seals.

2. An apparatus for forming a chain of interconnected flexible containers from a continuous, longitudinal, web of material having two overlying plies, comprising:
(a) a heat sealing assembly for forming two adjacent, spaced apart heat seals on said web at spaced intervals, said seals extending transversely of said web and defining trailing and leading edges of adjacent containers;
(b) said assembly including one portion reciprocally mounting a heat sealing head defining a pair of spaced apart heating jaws;
(c) a backup bar carried by said heat sealing assembly and fixedly secure with respect to said heat sealing head and extending substantially parallel to said heating jaws;
(d) a pair of parallel spaced apart seal contact bars mounted to another portion of said assembly in alignment with said heat sealing jaws;
(e) means for driving said spaced heat sealing jaws into abutting contact with said seal contact bars;
(f) a perforation mechanism forming part of said other portion including:
(i) a carriage mounting a perforating wheel for rotation about an axis transverse to said heat sealing jaws;
(ii) means for guiding said carriage between fixed abutments, said means for guiding located immediately adjacent said seal contact bars such that at least a portion of said perforating wheel travels between said heat seal contact bars, said abutments selected such that when said carriage engages either of said abutments, said perforating wheel is out of contact with said web;
(iii) a biasing means urging said perforating wheel into abutting contact with said backup bar, said biasing means generating a frictional force between aaid perforating wheel and said backup bar such that said perforating wheel is caused to rotate with respect to said backup bar as said carriage travels between said fixed abutments;
(iv) drive means for reciprocally driving said carriage between said abutments.

3. The apparatus of claim 2, wherein said backup bar is located in a plane spaced from another plane defined by said jaws when in contact with said heat contact bars.

* * * * *